United States Patent [19]

Yanagita et al.

[11] Patent Number: 5,208,091
[45] Date of Patent: May 4, 1993

[54] MAGNETIC RECORDING MEDIUM

[75] Inventors: Takafumi Yanagita; Tsutomu Kenpo, both of Hino, Japan

[73] Assignee: Konica Corporation, Tokyo, Japan

[21] Appl. No.: 558,089

[22] Filed: Jul. 25, 1990

[30] Foreign Application Priority Data

Jul. 31, 1989 [JP] Japan .................. 1-198167

[51] Int. Cl.$^5$ .................. B32B 3/10; B32B 5/16; G11B 5/66
[52] U.S. Cl. .................. 428/141; 428/323; 428/329; 428/336; 428/900; 428/694 BG
[58] Field of Search .............. 428/323, 329, 336, 694, 428/900, 141; 427/131

[56] References Cited

U.S. PATENT DOCUMENTS

| | | | |
|---|---|---|---|
| 4,135,031 | 1/1979 | Akashi et al. | 428/900 |
| 4,506,000 | 3/1985 | Kubota et al. | 428/694 |
| 4,612,235 | 9/1986 | Ushimaru et al. | 428/900 |
| 4,865,924 | 9/1989 | Saito et al. | 428/694 |
| 4,946,740 | 8/1990 | Ono et al. | 428/694 |
| 4,992,330 | 2/1991 | Kawahara et al. | 428/694 |
| 5,026,598 | 6/1991 | Koyama et al. | 428/900 |

*Primary Examiner*—Paul J. Thibodeau
*Assistant Examiner*—Leszek Kiliman
*Attorney, Agent, or Firm*—Jordan B. Bierman

[57] ABSTRACT

A magnetic recording medium comprising at least two magnetic layers provided on a non-magnetic support, and a backing layer on the support on the side opposite to said magnetic layers, wherein said backing layer has, on the surface thereof, the protrusions each having a height of the peaks thereof within the range of 0.05 μm to 0.6 μm wherein the amount of the protrusions is within the range of 10,000 to 100,000 cm$_2$ and an interval of the peaks of not less than 10 μm.

14 Claims, 1 Drawing Sheet

MAGNETIC RECORDING MEDIUM

FIELD OF THE INVENTION

This invention relates to magnetic recording media such as magnetic tapes, magnetic sheets and magnetic disks.

BACKGROUND OF THE INVENTION

Generally, magnetic recording media such as magnetic tapes are prepared by coating a magnetic paint comprising magnetic powder and binder resin on a support. Since the conventional types of magnetic recording media comprise only one magnetic layer, it is required to cover a wide frequency bandwidth from the low to the high with single kind of magnetic powder. Particularly in the recent tendency of making recording densities higher, there are the demands for magnetic recording media improved to have the recording characteristics in the high band and low noises. Therefore, magnetic powder having both of high coersive force, Hc and large surface area represented by BET values are used.

However, since the magnetic recording media are each comprised of a single kind of magnetic powder, i.e., a single kind of magnetic layer, these media have to use high Hc and BET magnetic powder in the excess of paying attention to improve the characteristics of the high bandwidth, thereby lowering the characteristics of the low bandwidth.

On one hand, in the magnetic recording media for video use, there have been some proposals for the media each having a plurality of magnetic layers so as to increase the magnetic recording capacity or to improve and/or keep the balance of the magnetic recording characteristics between the high and low band each of the media. For further details, refer to Japanese Patent Publication Open to Public Inspection (hereinafter referred to as Japanese Patent O.P.I. Publication) Nos. 48-98803/1973 and 59-172142/1984, Japanese Patent Examined Publication No. 32-2218/1957, Japanese Patent O.P.I. Publication No. 51-64901/1976, Japanese Patent Examined Publication No. 56-12937/1981, and Japanese Patent O.P.I. Publication Nos. 58-56228/1983 and 63-146211/1988.

According to the above-given prior arts, the magnetic layers are so designed as to separate the characteristic functions thereof into two; namely, the upper layer for taking the role of video outputs, and the lower layer for taking the roles of chroma and audio outputs. Further, in the media having the multilayered or laminated type magnetic layers, the uppermost magnetic layer is generally so formed as to have a thin layer thickness of not more than 0.6 μm.

On the other hand, the surface of the above-described uppermost layer is finished to be so flat and smooth as to increase the output, particularly a video output, of the high frequency band. However, such a flat and smooth surface is liable to produce a reeling failure when taking up or rewinding up a medium or especially a tape, a running failure or a output disorder. To remedy these disadvantages, it may be considered to provide a backing layer comprising non-magnetic particles set with binders to the surface of a support on the opposite side of a magnetic layer.

However, when a magnetic recording medium is taken up, the unevenness of the backing layer surface is imprinted onto the uppermost magnetic layer surface so as to damage the surface characteristics, thereby seriously deteriorating the electromagnetic conversion characteristics of, especially, video outputs of the medium. It may be presumed that the unevenness of the backing layer surface is liable to be imprinted onto the magnetic layer surface, because the backing layer surface is so made coarse as to secure the running property thereof. According to the studies on the invention, the reasons thereof are that the RF output of the magnetic layer is seriously deteriorated by the transfer when the backing layer surface is uniformly roughened and, in particular, the characteristics, i.e., the video output or RF output, of the magnetic layer are seriously affected when the imprint is received from the backing layer, because the uppermost magnetic layer is a thin layer having a thickness of not more than 0.6 μm. The above-mentioned disadvantages will lead a medium comprising only a single magnetic layer to an unexpected characteristic deterioration.

SUMMARY OF THE INVENTION

It is a principal object of the invention to provide a magnetic recording medium capable of reducing imprints from a backing layer onto a laminating type magnetic layer, diminishing the lowering of an RF output, and making a running durability excellent.

This invention relates to a magnetic recording medium comprising a magnetic layer having at least two component layers on a non-magnetic support, and a backing layer on the non-magnetic support on the side opposite to the magnetic layer; wherein the backing layer has on the surface thereof, 10,000 to 100,000 protrusions per $cm^2$, each protrusion having a height of 0.05–0.06 μm; the interval between protrusions being not less than 10 μm.

BRIEF DESCRIPTION OF THE DRAWINGS

The drawings attached hereto exemplify the invention.

DETAILED DESCRIPTION OF THE INVENTION

Figure 1:
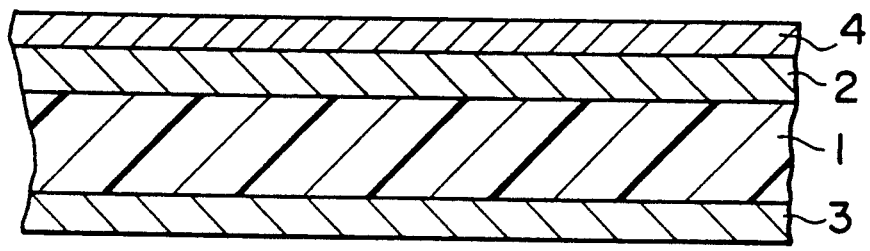
FIGS. 1 and 2 each illustrate the cross-sectional views of two examples of magnetic recording media.

According to the invention, the magnetic layer is comprised of a plurality of component layers of the multilayer or laminated type. Therefore, each of the layers can be so formed as to make the uppermost layer thereof excellent in the recording and play-back characteristics such as the video outputs in a high frequency bandwidth and to make the lower layer excellent in the recording and play-back characteristics such as the chroma and audio outputs in the relatively lower frequency bandwidth. Generally for this type of embodiments, it is required to make the coercive force of the upper layer, particularly the uppermost layer greater than that of the lower layer and to make the coating or layer thickness of the upper layer thinner to be, desirably, not more than 0.6 μm. It is further desirable to make the lower layer adjacent to the upper layer to have a coating thickness within the range of 1.5 to 4.0 μm.

In the meantime, in such a multilayer type magnetic layer as mentioned above, it is preferable to make the uppermost layer surface be flat and smooth so that an output is made greater in high frequency bandwidth. On the other hand, however, the foregoing imprint is liable to occur from the backing layer. In contrast to the above, according to the invention, the backing layer surface has 10,000 to 100,000 protrusions per cm$^2$, each having a height of 0.05 to 0.6 μm; the interval between protrusions being not less than 10 μm. It can, therefore, be proved that the foregoing imprint can be reduced. In other words, the surface of the backing layer can be flat and smooth and the imprint to the uppermost component layer of the magnetic layer can be reduced and, further, the frictional coefficient can be made greater as much as to keep the running property or running durability excellent, because the foregoing protrusions are present in the so-called spike-like in an appropriate size and an amount of distribution on the backing layer surface.

It is inevitable that the foregoing protrusions of the backing layer should be present at the above-mentioned height, proportion and interval. If the height is lower than 0.05 μm, the backing layer surface is made so flat and smooth that the friction is increased and the running property is deteriorated. If the height exceeds 0.6 μm, a imprint to the magnetic layer is caused. The height is within the range of, preferably, 0.05 to 0.4 μm and, more preferably, 0.06 to 0.2 μm. If the number of protrusions is less than 10,000 per cm$^2$, the backing layer surface is too flat and smooth because the numbers of the protrusions are too small. If the number exceeds per 100,00 per cm$^2$, the roughness of the backing layer surface becomes equal to a uniform roughness. Both cases are not appropriate. The number of protrusions is preferably within the range of, 30,000 to 90,000 per cm$^2$ and, more preferably, 50,000 to 80,000 per cm$^2$. If the interval between protrusions is less than 10 μm, it is not appropriate, because the protrusion distribution is increased too much so that the roughness of the backing layer is also uniform. The interval is preferably within the range of, preferably, 10 to 350 μm and, more preferably, 20 to 200 μm, provided, the upper limit of the intervals is preferable to be 500 μm, because the backing layer surface is made flat if the interval is any greater.

It is desirable that the above-mentioned protrusions each have a diameter, i.e., a longitudinal or particle size, within the range of 0.02 to 1.0 μm. If the diameter is too small, there are the tendencies to make the surface of the backing layer flat and to deteriorate the running property thereof. If it is too large, there are tendencies to cause a imprint to the magnetic layer and to deteriorate the RF outputs. For producing the above-mentioned protrusions, the particle size and amount of non-magnetic particles to be added is determined in advance when the later-detailed non-magnetic particles are dispersed in binders so as to prepare the paint for the backing layer.

In the invention, it is desirable that a plurality of the component layers, i.e., the uppermost layers and the lower layer, constituting a magnetic layer are adjacent to each other. The lower layer may comprise either a single layer or not less than two layers, provided, there is an instance where an interface between the two layers, which having a certain thick-mixture region containing magnetic powders, besides the instance where an apparent interface is substantially present between the layers and, in either instances, the upper or lower layer, from which such an interface as mentioned above is removed, is used as each of the above-mentioned layers. In particular, the media of the invention can suitably be used when each of the magnetic layers is coated in a wet-on-wet coating method. It is the matter of course that a wet-on-dry coating method in which the upper layer is coated after drying the lower layer may be used.

As shown in FIG. 1, for example, the magnetic recording media of the invention are those prepared by laminating the first magnetic layer 2 and the second magnetic layer 4 in order on non-magnetic support 1 comprising polyethyleneterephthalater or the like. In addition, Backing layer 3 is arranged to one support side opposite to the laminated layer side. It is also allowed to arrange an overcoat layer onto the second magnetic layer. In the example illustrated in FIG. 2, the upper layer is separated into layers 5 and 6.

Figure 2:
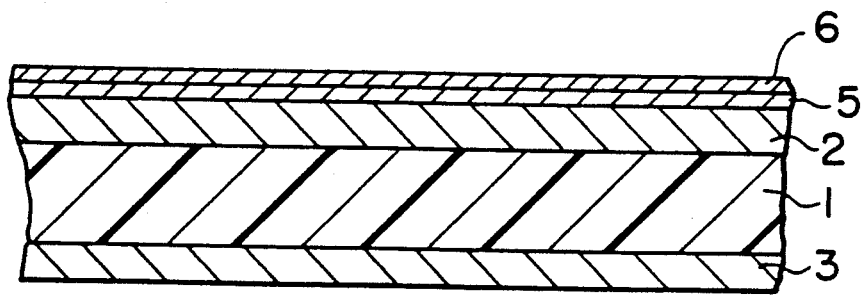

In the magnetic recording media shown in FIGS. 1 and 2, it is preferable that a layer thickness of the first magnetic layer 2 is within the range of 1.5 to 4.0 μm, and that the layer thickness of the second magnetic layer 4 or the total layer thickness of the third magnetic layers 5 and 6 is not thicker than 0.6 μm such as 0.5 μm. For the layer thickness of backing layer 3 it is preferable to be not thicker than 2 μm such as 1.0 μm.

Magnetic layers 2, 4, 5 and 6 are each allowed to contain magnetic powder. Such magnetic powder include, for example, a variety of ferromagnetic powder such as magnetic iron oxide powder, e.g., $\gamma$-Fe$_2$O$_3$, Co-containing $\gamma$-Fe$_2$O$_3$, Fe$_3$O$_4$, and Co-containing Fe$_3$O$_4$; and metal magnetic powder principally comprising Fe, Ni and Co, e.g., Fe-Ni-Co alloy, Fe-Ni alloy, Fe-Al alloy, Fe-Al-Ni alloy, Fe-Al-Co alloy, Fe-Mn-Zn alloy, Fe-Ni-Zn alloy, Fe-Al-Ni-Co alloy, Fe-Al-Ni-Cr alloy, Fe-Al-Co-Cr alloy, Fe-Co-Ni-Cr alloy, Fe-Co-Ni-P alloy, and Co-Ni alloy.

From among the above-given magnetic powder, any suitable ones can selectively be used in each of the above-described magnetic layers 2 and 4. For example, when the upper layer 4 uses one of them having a coercive force Hc higher than that of the lower layer 2, a medium having a substantially high output can be prepared.

Each of the magnetic layers are also allowed to contain the following additives including, for example; a lubricant such as silicone oil, graphite, molybdenum disulfide and tungsten disulfide; a monobasic fatty acid having 12 to 20 carbon atoms, such as stearic acid, and a fatty acid ester having 13 to 40 carbon atoms in total; an abrasive such as fused alumina; and an antistatic agent such as carbon black and graphite.

The binders applicable to magnetic layers 2, 4, 5 and 6 are those having an average molecular weight within the range of, approximately, 10000 to 200000, which include, for example, a vinyl chloride-vinyl acetate copolymer, a vinyl chloride-vinylidene chloride copolymer, a vinyl chloride-acrylonitrile copolymer, a vinyl polychloride, a urethane resin, a butadiene-acrylonitrile copolymer, a polyamide resin, a polyvinyl butyral, a cellulose derivative such as cellulose acetatebutylate, cellulose diacetate, cellulose triacetate, cellulose propionate and nitrocellulose, a styrene-butadiene copolymer, a polyester resin, various types of synthetic rubber, a phenol resin, an epoxy resin, a urea resin, a melamine resin, a phenoxy resin, a silicone resin, an acryl type reactive resin, a mixture of a high moleculer weight polyester resin and an isocyanate prepolymer, an mixture of a polyester polyol and a polyisocyanate, a urea formaldehyde resin, a mixture of a low molecular weight glycol, a high molecular weight diol and an isocyanate, and the mixtures thereof.

The above-given binders are preferable to be a resin containing a hydrophilic polar group including, for example, $-SO_3M$, $-COOM$ and $-PO(OM')_2$ in which M represents a hydrogen atom or an alkali metal such as lithium, potassium and sodium. In other words, the affinity of the resins to magnetic powder is improved by their own intramolecular polar group, thereby further improving the dispersibility of the magnetic powder, preventing the magnetic powder from cohering so as to further improve the stability of a coating solution and, accordingly, improving the durability of the medium.

The binders, particularly, the vinyl chloride type copolymers, can be prepared by copolymerizing a vinyl chloride monomer, a copolymeric monomer containing the salt of sulfonic acid or phosphoric acid and, if required, other copolymeric monomers. These copolymers may readily be synthesized, because they are derived from a vinyl synthesization, and the copolymerization components may variously be selected and the optimum characteristics of the copolymers may also be adjusted.

The metals of the above-mentioned sulfonates or phosphates are alkali metals such as sodium, potassium and lithium. Among these alkali metals, potassium is particularly preferable from the viewpoints of the solubility, reactivity and yield thereof.

Upon addition of non-magnetic particles into the above-mentioned binders, backing layer 3 is then coated on the rear side of a support. The non-magnetic particles include, for example, those comprising silicon oxide, titanium oxide, aluminium oxide, chromium oxide, silicon carbide, calcium carbide, zinc oxide, $\alpha\text{-}Fe_2O_3$, talc, kaolin, calcium sulfate, boron nitride, zinc fluoride, molybdenum dioxide, calcium carbide, or barium sulfate. Besides the above, an organic powder including, for example, those of a benzoguanamine type resin, a melamine resin and a phthalocyanine type pigment may also be used for. These organic particles may also be used with the foregoing inorganic particles in combination. It is further preferable to use the above-mentioned non-magnetic particles together with carbon black. When this is the case, the running property of a medium can further be stabilized and the durability of the medium can further be improved with the aid of the functions of the non-magnetic particles.

In addition to the above, as for the raw materials of the foregoing support 1, plastics such as polyethylene terephthalate and polypropylene; metals such as Al and Zn; glass; BN; Si carbide; and seramics such as pocelain and earthenware, each may be used.

EXAMPLE

An example of the invention will now be detailed below.

The components, proportions and operational formalities each indicated below may variously be modified, provided, the modifications shall not be departed from the spirit or essential character of the invention. In the example, the term, 'a part' or 'parts' means 'a part by weight' or 'parts by weight, respectively.'

Each of the magnetic paints were prepared by kneading and then dispersing the following compositions:

| Magnetic paint A for the upper layer | |
|---|---|
| Co-$\gamma$-Fe$_2$O$_3$ in which Hc = 900 Oe, BET value = 45 m$^2$/g, and average longitudinal axis = 0.2 $\mu$m | 100 parts |
| Potassium sulfonate containing-vinyl chloride type resin, MR 110, manufactured by Japan Zeon Co. | 10 parts |
| Polyurethane resin, XE-1, manufactured by Takeda Phermaceutical Industrial Co. | 5 parts |
| a-Al$_2$O$_3$ having an average particle size of 0.2 $\mu$m | 6 parts |
| Carbon black | 1 part |
| Myristic acid | 1 part |
| Stearic acid | 1 part |
| Butyl stearate | 1 part |
| Polyisocyanate, Colonate L, manufactured by Japan Polyurethane Co. | 5 parts |
| Magnetic paint B for the lower layer | |
| Co-$\gamma$-Fe$_2$O$_3$, in which Hc = 700 Oe, BET value = 28 m$^2$/g, and an average logitudinal axis of 0.25 $\mu$m | 100 parts |
| Potassium sulfonate containing-vinyl chloride type resin, MR 110, manufactured by Japan Zeon Co. | 10 parts |
| Polyurethane resin, XE-1, manufactured by Takeda Phermaceutical Industry Co. | 5 parts |
| Myristic acid | 1 part |
| Stearic acid | 1 part |
| Butyl stearate | 1 part |
| Polyisocyanate, Colonate L, manufactured by Japan Polyurethane Co. | 5 parts |

Next, magnetic paints B for the lower layer and magnetic paint A for the upper layer were coated in order onto a 14.5 $\mu$m-thick polyethylene terephthalate film base and subjected to an orientation. After it was dried up, it was subjected to a calender treatment. In this instance, the upper layer and the lower layer were provided to have the dried thicknesses of 0.3 $\mu$m and 2.0 $\mu$m, respectively.

After then, a paint for backing layer, which has the following composition, was coated on the side of the support opposite to the magnetic layer side so that the dried thickness of 1.0 $\mu$m was formed, wherein coarse particles of zinc oxide and carbon black having an average diameter of 0.03 $\mu$m were used.

| Fine particles | X parts |
|---|---|
| Coarse particles in which X + Y = 100 | Y parts |
| Nitrocellulose, BTH$\frac{1}{2}$, manufactured by Asahi Kasei Co. | 40 parts |
| Polyurethane, N-2301, manufactured by Japan Polyurethane Co. | 40 parts |
| Colonate L, manufactured by Japan Polyurethane Co. | 20 parts |
| Cyclohexanone | 900 parts |
| Methylethyl ketone | 450 parts |
| Toluene | 450 parts |

The wide magnetic film prepared in the above-described manner was taken up and then cut into every $\frac{1}{2}$ inch width, so that each of the tapes was prepared. The conditions of the backing layer surface were variously changed as shown in the following Table-1, wherein the size of coarse particles and a ratio of fine particles to coarse particles were each changed.

Then, the characteristics of each tape was evaluated as follows. The results thereof are shown in Table-1.

(a) An average surface roughness

A three-dimensional surface roughness tester, 3FK, manufactured by Kosaka Research Laboratories was used to make the measurements in which a cut-off was 0.25 mm.

(b) Kinematic friction coefficient, μk

A tape was wound round a 4φ chrome-plated stainless steel pin to a 180 degree position by means of a tape-running tester, TBT-300D, manufactured by Yokohama System Research Laboratories, and the measurements were carried out under the conditions of the tape running speed of 3.3 m/sec. and the entry tension of 20 g. The μk values was calculated in the following formula: $\mu k = 1/\pi l_n \times /20$, in which x represents the entry tensioning.

(c) RF output variation

An image was recorded by means of a video deck, HR-S7000 manufactured by Victor Corp and a noise meter, 925 D-1 manufactured by Shiba-Soku Co., and at a temperature of 40° C. and a relative humidity of 80%. The difference of RF output between virgin tape and after plaging back for 100 hours was measured.

(d) Scratch and imprint

The observations thereof were visually made.

TABLE-1

| | | Comparative example 1 | Comparative example 2 | Comparative example 3 | Comparative example 4 | Comparative example 5 | Comparative example 6 |
|---|---|---|---|---|---|---|---|
| Magnetic layer | | Single layer | Single layer | Single layer | Double layer | Double layer | Double layer |
| Diameter of coarse particles of backing layer, μm | | None | 0.5 | 0.5 | None | 0.5 | 0.5 |
| A fine-particle/coarse particle ratio of backing layer (X/Y) | | 100/0 | 90/10 | 80/20 | 100/0 | 99/1 | 97/3 |
| Surface protrusions on backing layer of virgin tape | Number of peaks, × $10^4$/cm$^2$ | 0 | 5.2 | 12.0 | 0 | 0.1 | 0.8 |
| | Interval of peaks, μm | — | 10~100 | <10 | — | 150~300 | 150~300 |
| | Height of peaks, μm | — | 0.2 | 0.2 | — | 0.2 | 0.2 |
| Kinetic friction coefficient of magnetic layer | | 0.028 | 0.028 | 0.027 | 0.031 | 0.030 | 0.030 |
| Kinetic friction coefficient of backing layer | | 0.025 | 0.020 | 0.018 | 0.025 | 0.022 | 0.023 |
| Kinetic friction coefficient of tape after a 100 passes, in the magnetic layer | | 0.027 | 0.027 | 0.027 | Stuck on | 0.028 | 0.028 |
| Kinetic friction coefficient of tape after a 100 passes, in the backing layer | | 0.026 | 0.021 | 0.018 | Stopped | 0.027 | 0.028 |
| RF output variation, dB | | 0.3 | 0.2 | 0.2 | — | 1.2 | 0.8 |
| Scratch on magnetic layer | | Least | None | Least | Many | Few | Few |
| Scratch on backing layer | | Least | None | None | Many | Many | Many |
| Imprints from backing layer to magnetic layer | | None | None | Few | None | None | Least |

| | | Inventive example 1 | Inventive example 2 | Inventive example 3 | Comparative example 7 | Comparative example 8 | Comparative example 4 |
|---|---|---|---|---|---|---|---|
| Magnetic layer | | Double layer | Double layer | Double layer | Double layer | Double layer | Double layer |
| Diameter of coarse particles of backing layer, μm | | 0.5 | 0.5 | 0.5 | 0.5 | 0.5 | 0.3 |
| A fine-particle/coarse particle ratio of backing layer (X/Y) | | 95/5 | 90/10 | 85/15 | 80/20 | 82/18 | 90/10 |
| Surface protrusions on backing layer of virgin tape | Number of peaks, × $10^4$/cm$^2$ | 1.5 | 5.2 | 9.0 | 12.0 | 12.0 | 5.2 |
| | Interval of peaks, μm | 150~300 | 10~100 | 10~50 | <10 | 10~50 | 10~50 |
| | Height of peaks, μm | 0.2 | 0.2 | 0.2 | 0.2 | 0.2 | 0.05 |
| Kinetic friction coefficient of magnetic layer | | 0.029 | 0.030 | 0.029 | 0.029 | 0.028 | 0.029 |
| Kinetic friction coefficient of backing layer | | 0.020 | 0.020 | 0.019 | 0.018 | 0.018 | 0.022 |
| Kinetic friction coefficient of tape after a 100 passes, in the magnetic layer | | 0.028 | 0.028 | 0.027 | 0.027 | 0.027 | 0.027 |

TABLE-1-continued

|  |  |  |  |  |  |  |
|---|---|---|---|---|---|---|
| Kinetic friction coefficient of tape after a 100 passes, in the backing layer | 0.020 | 0.020 | 0.019 | 0.018 | 0.020 | 0.023 |
| RF output variation, dB | 0.1 | ≦0.1 | 0.2 | 1.5 | 1.5 | 0.3 |
| Scratch on magnetic layer | Least | None | None | None | None | Few |
| Scratch on backing layer | None | None | Least | None | None | Least |
| Imprints from backing layer to magnetic layer | None | None | Least | Many | Many | Least |

|  |  | Inventive example 5 | Inventive example 6 | Inventive example 7 | Inventive example 8 | Comparative example 9 |
|---|---|---|---|---|---|---|
| Magnetic layer |  | Double layer | Double layer | Double layer | Double layer | Double layer |
| Diameter of coarse particles of backing layer, μm |  | 0.8 | 1.0 | 0.8 | 0.8 | 1.2 |
| A fine-particle/coarse particle ratio of backing layer (X/Y) |  | 90/10 | 90/10 | 95/5 | 82/18 | 90/10 |
| Surface protrusions on backing layer of virgin tape | Number of peaks, × 10⁴/cm² | 5.2 | 5.2 | 1.0 | 10.0 | 5.2 |
|  | Interval of peaks, μm | 10~100 | 10~100 | 150~300 | 10~100 | 10~100 |
|  | Height of peaks, μm | 0.5 | 0.6 | 0.5 | 0.5 | 0.8 |
| Kinetic friction coefficient of magnetic layer |  | 0.030 | 0.030 | 0.030 | 0.029 | 0.028 |
| Kinetic friction coefficient of backing layer |  | 0.020 | 0.020 | 0.021 | 0.018 | 0.019 |
| Kinetic friction coefficient of tape after a 100 passes, in the magnetic layer |  | 0.028 | 0.028 | 0.029 | 0.027 | 0.027 |
| Kinetic friction coefficient of tape after a 100 passes, in the backing layer |  | 0.021 | 0.022 | 0.022 | 0.020 | 0.026 |
| RF output variation, dB |  | 0.1 | 0.2 | 0.2 | 0.3 | 1.2 |
| Scratch on magnetic layer |  | None | None | None | Least | None |
| Scratch on backing layer |  | None | None | None | None | Few |
| Imprints from backing layer to magnetic layer |  | Least | Least | None | Least | Many |

Note,
coarse particles: Zinc oxide
fine particles: carbon black, 0.03 μm in average diameter From the results thereof, when the protrusions on the backing layer surface are made to have a height of 0.05 to 0.6 μm, are present in an amount of 10,000 to 100,000 per cm² and are spaced not less than 10 μm apart in accordance with the invention, any imprints from the backing layer can be eliminated; the output variation can remarkably be reduced; and the tape-running property can also be improved by lowering the frinction. The above-mentioned advantages are distinguished in such a multilayered magnetic layer as that of the invention. (Refer to the comparisons of inventive examples No. 1 through No. 8 with the comparative examples No. 4 through No. 9.) As seen in the comparative examples No. 1 through No. 3, in contrast to the above, when the magnetic layer is of the single layer type, the characteristic deteriorations were not so serious even if the backing layer surface is out of the scope of the invention. This is presumably because the structure of the surface side of the single layer type magnetic layer, in particular, is quite different from that of the multilayer type of magnetic layer. In other words, in the case of the multilayer type, as compared to the single layer type, it may be presumed that the multilayered magnetic layer is liable to be affected susceptibly by the backing layer, because the substantially thin uppermost layer is made present on the surface of the multilayered magnetic layer.

On the other hand, the magnetic layer of inventive example No. 2 was so prepared to have three component layers. The thicknesses thereof were 0.3 μm for the uppermost layer, 0.3 μm for the interlayer and 2.0 μm for the lower layer. The compositions of the uppermost layer and the lower layer thereof were the same as in inventive example No. 2. This example was prepared in the same manner as in inventive example No. 2, except that the interlayer used the magnetic powder having a coercive force, Hc of 900 Oe, a BET value of 40 m²/g and an average longitudinal axis length of 0.2 μm. Besides the above, the backing layer and the support were the same as in inventive example No. 2. The data obtained from this sample are as follows. The results thereof are excellent.

TABLE-2

| | |
|---|---|
| Kinetic friction coefficient of magnetic layer | 0.031 |
| Kinetic friction coefficient of backing layer | 0.020 |
| Kinetic friction coefficient of magnetic layer, after the tape subjected to a 100-passes | 0.028 |
| Kinetic friction coefficient of backing layer, | 0.021 |

TABLE-2-continued

| | |
|---|---|
| after the tape subjected to a 100-passes | |
| RF output variation, dB | 0.1 |
| Scratch on magnetic layer | None |
| Scratch on backing layer | None |
| Imprints from backing layer to magnetic layer | None |

What is claimed is:

1. A magnetic recording medium comprising at least two magnetic layers provided on a first side of a non-magnetic support, and a backing layer on a second side of said support, wherein at least one of said magnetic layers comprises a resin containing a hydrophilic polar group selected from the group consisting of $-SO_3M$, $-COOM$, and $-PO(OM)_2$, in which M represents hydrogen or an alkali metal; the uppermost layer of said magnetic layers having a thickness of not more than 0.6 $\mu m$; said backing layer having, on the surface thereof, 10,000 to 100,000 protrusions per $cm^2$, each having a height of 0.05 to 0.6 $\mu m$, and an interval between protrusions being not less than 10 $\mu m$.

2. The magnetic recording medium of claim 1, wherein the heights of said protrusions are within the range of 0.05 to 0.4 $\mu m$.

3. The magnetic recording medium of claim 1, wherein the amount of said protrusions is within the range of 30,000 to 90,000 $cm^2$.

4. The magnetic recording medium of claim 1, wherein the interval of said protrusions is within the range of 10 to 350 $\mu m$.

5. The magnetic recording medium of claim 1, wherein said backing layer has a thickness of not more than 2 $\mu m$.

6. The magnetic recording medium of claim 1, wherein said backing layer contains non-magnetic particles.

7. The magnetic recording medium of claim 1 wherein said resin is a copolymer comprising vinyl chloride and a monomer containing a $-SO_3M$ or $-PO(OM)_2$ group.

8. The magnetic recording medium of claim 2, wherein said heights are within the range of 0.06 to 0.2 $\mu m$.

9. The magnetic recording medium of claim 3, wherein the amount of said protrusions is within the range of 50,000 to 80,000 $cm^2$.

10. The magnetic recording medium of claim 4, wherein the interval is within the range of 20 to 200 $\mu m$.

11. The magnetic recording medium of claim 6, wherein said non-magnetic particles comprise silicon oxide, titanium oxide, aluminium oxide, chromium oxide, silicon carbide, calcium carbide, zinc oxide, $\beta$-$Fe_2O_3$, talc, kaolin, calcium sulfate, boron nitride, zinc fluoride, molybdenum dioxide, calcium carbonate or barium sulfate.

12. The magnetic recording medium of claim 11, wherein said non-magnetic particles comprise titanium oxide, zinc oxide, calcium carbonate or barium sulfate.

13. The magnetic recording medium of claim 6, wherein said backing layer contains carbon black.

14. The magnetic recording medium of claim 11, wherein said backing layer contains carbon black.

* * * * *